J. FORSTER.
APPARATUS FOR PREPARING TANNING LIQUORS.
APPLICATION FILED APR. 29, 1911.

1,107,925.

Patented Aug. 18, 1914.

Witnesses:
Waldo M. Chapin
William C. Lang

Inventor
Joseph Forster
by
Rosenbaum & Stockbridge
Attys

UNITED STATES PATENT OFFICE.

JOSEPH FORSTER, OF WARRINGTON, ENGLAND.

APPARATUS FOR PREPARING TANNING LIQUORS.

1,107,925.   Specification of Letters Patent.   Patented Aug. 18, 1914.

Application filed April 29, 1911. Serial No. 624,023.

*To all whom it may concern:*

Be it known that I, JOSEPH FORSTER, a subject of the King of Great Britain and Ireland, and a resident of Warrington, in the county of Lancaster, England, have invented new and useful Improvements in Apparatus for Preparing Tanning Liquors, of which the following is a specification.

This invention relates to apparatus for preparing tanning liquors.

As has before been known and is at present usual the liquor is prepared in a series of tanks or pits, the fresh tanning material being first placed in one of the end tanks of the series and then being passed successively through the other pits of the series to the other end one from which it is removed in an exhausted condition. Water is added to this last pit and passes through the series of pits to the one to which the fresh tanning material is first added. The liquid and the tanning material thus pass in opposite directions through the pits, the liquid first coming into contact with material which is about exhausted and coming into contact with progressively stronger charges until it has its highest strength in the pit in which the tanning material is first placed. In carrying this invention into effect the liquor and the tanning material likewise pass in opposite directions through a series of leaching pits but each pit has a perforated or like cage to contain the tanning material which is to be leached. Each such cage is immersed or partly immersed in the liquid of its pit and is movable, as, for example, by being hinged, so that when desired it can be moved to discharge its contents into the cage of the pit next to it toward the water supply end of the series of pits. The cages may be kept continuously agitated by suitable means. Each pit may be higher than the next pit which is farther from the water supply end of the series and be arranged to continuously or intermittently overflow into such pit, the liquor being preferably drawn from the bottom of each pit and discharged into the upper part of the next pit through the overflow pipes D.

Figure 2:
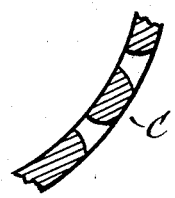
Figure 1:
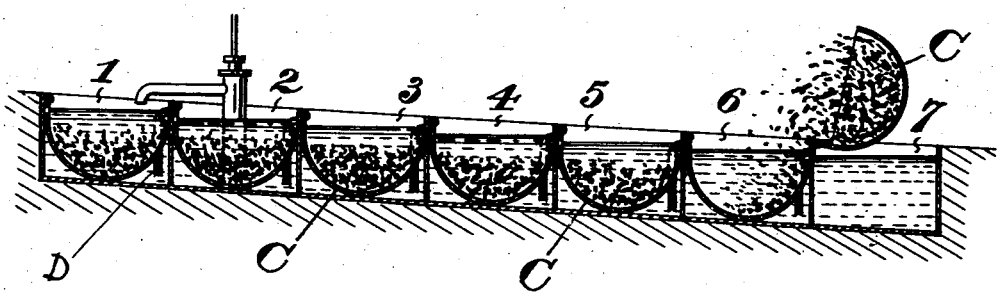
Figure 3:
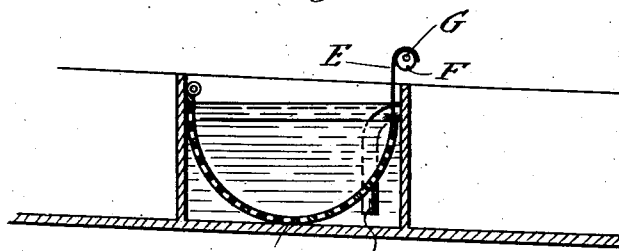

In the accompanying drawings Figure 1 is a vertical longitudinal section of a series of pits and associated parts embodying the features of my invention; Fig. 2 is a sectional detail of the perforations in the cage; and Fig. 3 is a detail showing the manner in which the cages are agitated.

There may be any required number of pits to form a series. Seven (1 to 7) are employed in the illustration. In each is a cage C in which the tanning material is placed and in which such material is acted on by the liquid in the pit. Each cage is so disposed that its lower part is immersed in liquid and it is so formed that it can be moved to transfer its contents to the cage in the next higher pit. The fresh tanning material to be leached is first placed in the cage C of the lowest leaching pit 7 and as the extraction of its contents proceeds it is transferred from cage to cage C throughout the ascending series of pits 7 to 1 until it is finally treated and exhausted in the cage C of pit 1 from which it is thrown out in the spent condition. The fresh water is added to pit No. 1 and as it passes down through pits 1 to 7 it progressively meets, as it becomes stronger and stronger, tanning material which is less and less exhausted, until it becomes its strongest in pit 7.

In the drawing the cage in pit 7 is shown as being lifted to discharge its contents into the next higher cage, which next higher cage has been previously discharged into the one still higher.

To assist in the leaching the cages C may be agitated. This may conveniently be accomplished by raising and lowering their lifting edges or sides for a distance of a few inches. One form of a device for accomplishing this result is shown in Fig. 3 and consists of hooks E which are fastened to the free edges of the cages and ride upon the cams F secured to rotating shaft G extending across the pits, the shafts being driven in any desired manner (not shown). The form of agitating device shown is one of the well known forms of such devices and its specific construction constitutes no part of the present invention. To insure the proper flow of liquid into the cages the perforations or the like therein may be wider on the outer faces of the cages than on the inner faces, so as to give bell or trumpet mouths to the perforations to insure the liquor freely entering into such perforations as the cages fall. (See Fig. 2.)

In addition to the overflow pipes D in the leaching pits by means of which each pit automatically overflows into the next lower one, such pits may have pumps by means of which, when desired, the liquor may be transferred from any one pit to the next or any other higher pit of the series. The strong liquor from the end pit may be supplied to the tan pits as desired. Such tan pits may also be at progressively lower levels so that the liquor may overflow from one to another in the manner described in connection with the leaching pits.

What I claim is:—

1. Apparatus for leaching tanning material, consisting of a series of adjoining pits disposed and arranged with successively lower liquid levels one way through the series, a source of leaching liquid supply to the pit having the highest liquid level, an overflow pipe between each of said pits and the next pit having a lower liquid level, and a hinged perforated cage in each pit to hold and retain the tanning material during leaching in that pit, each of said cages being hinged along the division line between said pit and the next pit having a higher liquid level and arranged to directly transfer its material to the like cage in the next higher pit and to directly receive material from the like cage of the next lower pit, substantially as described.

2. Apparatus for leaching tanning material, consisting of a series of adjoining pits disposed and arranged with successively lower liquid levels one way through the series, a source of leaching liquid supply to the pit having the highest liquid level, an overflow pipe between each pit and the next pit having a lower liquid level, and a hinged perforated cage in each pit to hold and retain the tanning material during leaching in that pit, the perforations in such cage being bell mouthed, substantially as hereinbefore described.

3. Apparatus for leaching tanning material, consisting of a series of pits disposed and arranged with successively lower liquid levels one way through the series, a source of leaching liquid supply to the pit having the highest liquid level, an overflow pipe between each pit and the next pit having a lower liquid level, a hinged perforated cage in each pit to hold and retain the tanning material during leaching in that pit, and means for agitating such cage, substantially as set forth.

In witness whereof I have hereunto set my hand in the presence of two subscribing witnesses.

JOSEPH FORSTER.

Witnesses:
 WILLIAM GEO. HEYS,
 JOHN O'CONNELL.